United States Patent Office 3,498,188
Patented Mar. 3, 1970

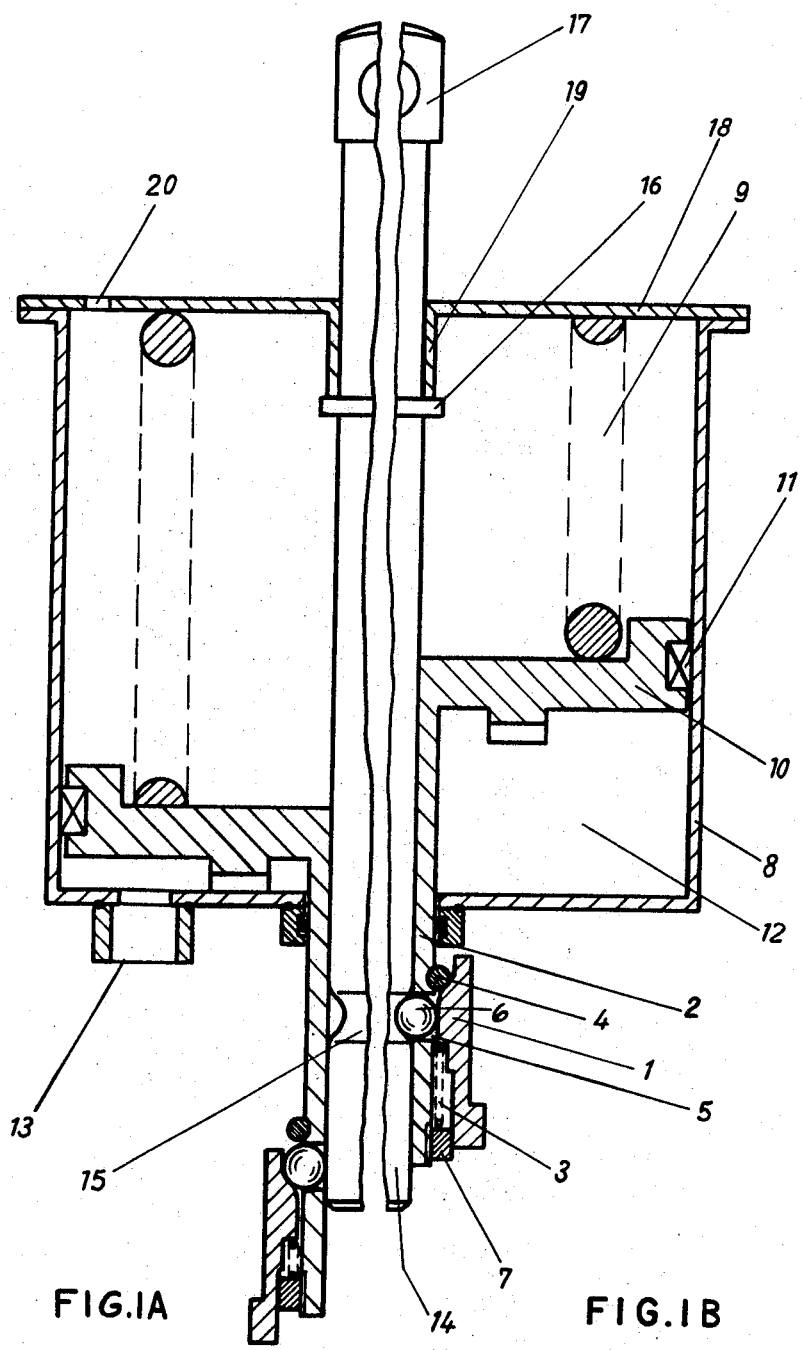

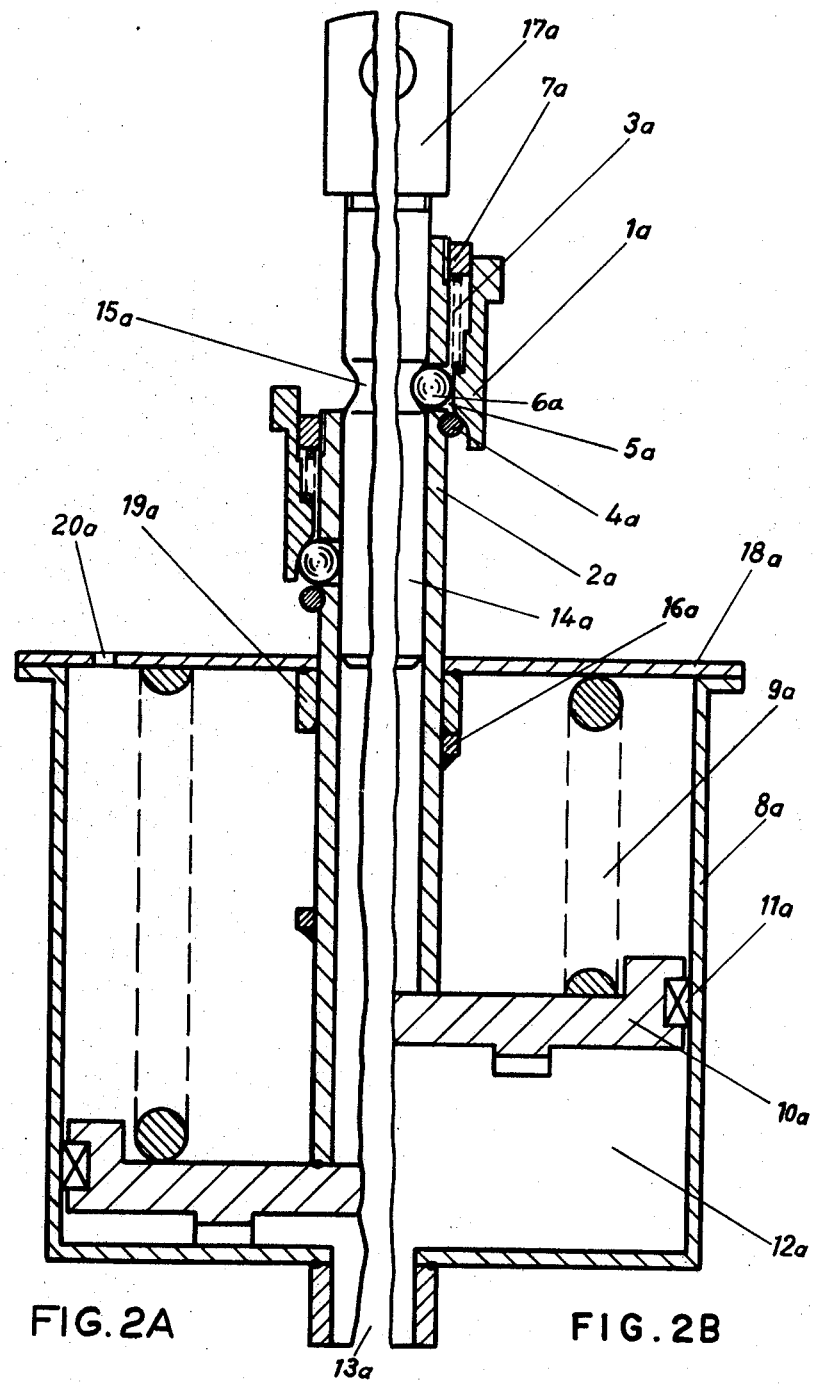

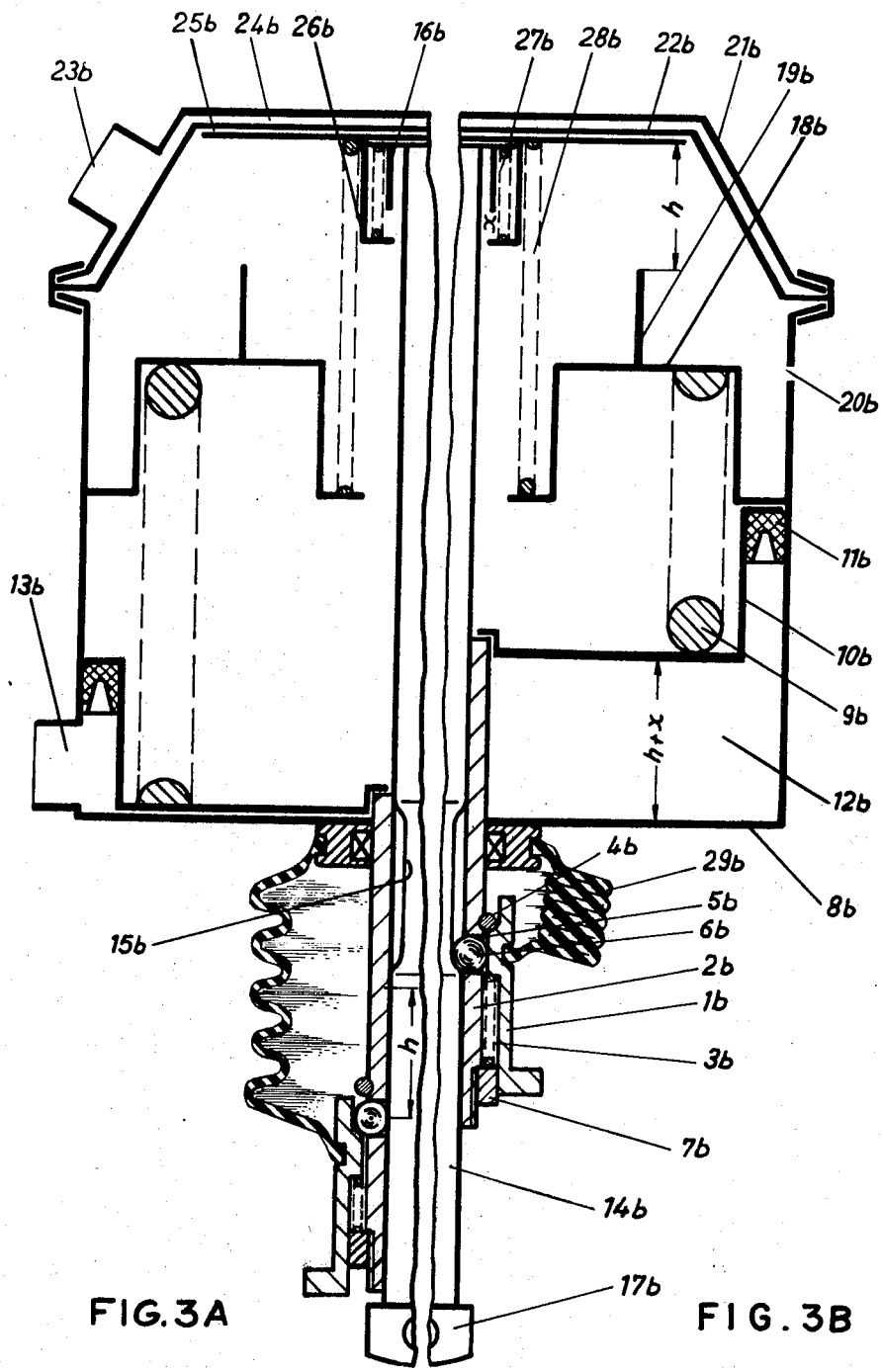

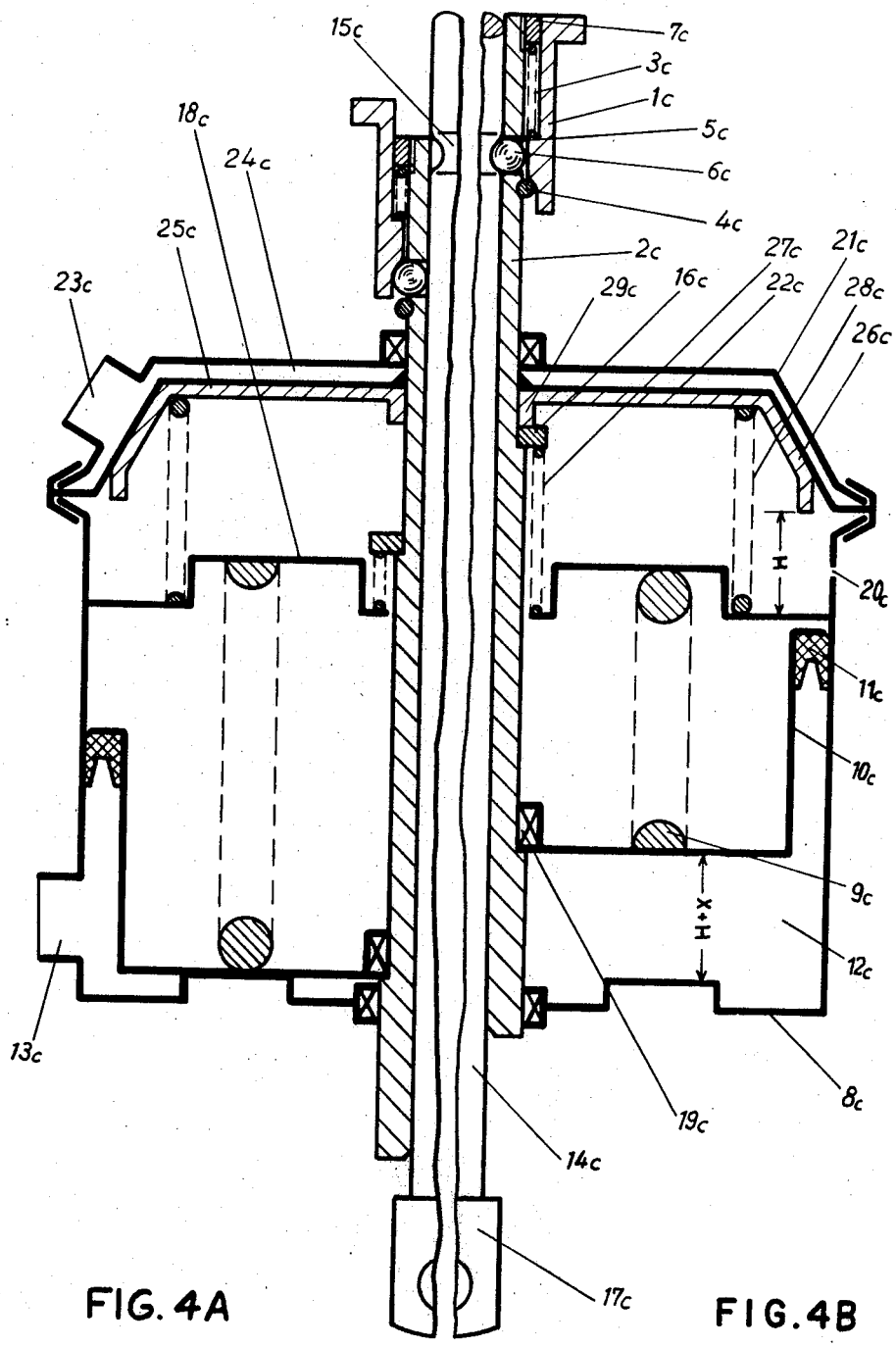

3,498,188
CYLINDER FOR SPRING-APPLIED BRAKE WITH EMERGENCY BRAKE RELEASE
Jose Antonio Rodriguez, Berenbostel, Germany, assignor to Westinghouse Bremsen-und Apparatebau G.m.b.H., Hannover, Germany
Filed Oct. 23, 1967, Ser. No. 677,346
Claims priority, application Germany, Oct. 26, 1966, W 38,388
Int. Cl. F01b 9/00, 7/00; B65h 59/10
U.S. Cl. 92—29       13 Claims

ABSTRACT OF THE DISCLOSURE

A cylinder for spring-applied brake with emergency brake release having a tubular piston extension releasably locked in a telescopic position relative to a piston rod by a ball carried in an aperture on the extension for transverse movement into and out of engagement with a concave peripheral slot on the piston rod, the transverse position of the ball being controlled by a releasable lock member carried on the extension and biased in an axial direction for camming the ball into a locked position in the slot, and manually movable against the bias to remove the cam and thereby release the ball whereupon the application of force moving the rod relative to the extension cams the ball from the slot for permitting the piston rod to be moved to a brake release position independently of the piston and piston extension.

The object of this invention is to provide a space-saving, easy to service, emergency brake release arrangement for a spring-applied brake, which arrangement may be used with various types of conventional spring-applied brake mechanisms.

In the present invention, this object is achieved by providing on a piston rod a concave peripheral groove, which piston rod is disposed in an axially displaceable manner relative to a tubular extension on a piston in a cylinder, which tubular extension is equipped with laterally opposing transversely extending through passages, each passage carrying a ball member for radial movement in the passages toward and away from the piston rod, by means of a bushing disposed on tubular extension for axial movement thereon. The bushing is spring biased to a first position radially moving the ball members inwardly of the passage means and is manually displaced in the opposite direction to release the ball member from its radial inward position. When the ball members are disposed in the radially inward position, the piston rod and the tubular extension are secured relative to each other by the ball-in-groove connection therebetween when the passages on the tubular extension and the peripheral groove on the piston rod are radially disposed relative to each other. When the ball members are disposed in the locked condition, the ball members are positioned in the peripheral groove with approximately ⅓ of their diameter extending radially inwardly of the tubular extension, and with the remaining ⅔ of their diameter disposed within the passages in the tubular extension so that when the bushing member is manually moved to the ball release position the concave contour of the groove will cam the ball members outwardly of the tubular extension to provide for free movement of the piston rod relative to the piston extension so that the piston rod may be independently moved to a brake release position. After the bushing has been manually moved to the ball release position and the piston rod has been moved relative to the tubular extension, the spring bias on the bushing will reposition the ball members in the locked position whenever the peripheral groove on the piston rod is again disposed transversely of the passage means in the piston extension.

This and other objects of the invention will become more readily apparent in the following description, taken in conjunction with the drawing, in which:

FIG. 1A is a sectional view of a cylinder for spring-applied brake with emergency brake release in which the emergency release mechanism is disposed on the end of the brake cylinder remote from the brake mechanism, showing the piston in brake-applying position and the piston rod in brake release position;

FIG. 1B is a sectional view of the cylinder of FIG. 1A, showing the piston and piston rod in a brake release position;

FIG. 2A is a cross-sectional view of a cylinder for spring-applied brake with an emergency brake release mechanism similar to that disclosed in FIG. 1, showing the emergency release mechanism disposed on the end of the cylinder adjacent the brake-applying mechanism, and showing the piston in the brake-applying position and the piston rod in a brake release position;

FIG. 2B is a sectional view of the cylinder of FIG. 2A, showing the piston and piston rod in a brake release position;

FIG. 3A is a cross-sectional view of another type of spring-applied brake cylinder, showing the emergency release mechanism disposed on the end of the cylinder adjacent the brake-applying mechanism, showing the piston in the brake-applying position and the piston rod in a brake release position;

FIG. 3B is a sectional view of the cylinder of FIG. 3A, showing the piston and piston rod in a brake release position;

FIG. 4A is a cross-sectional view of yet another cylinder for spring-applied brake with the emergency brake release mechanism disposed on the end of the cylinder remote from the brake-applying mechanism, and showing the piston in the brake-applying position and the piston rod in a brake release position; and FIG. 4B is a sectional view of the cylinder of FIG. 4A, showing the piston and piston rod in a brake release position.

Referring now to FIG. 1 of the drawing, there is shown a bushing 1 disposed on the tubular extension 2 movable from the position shown against the spring 3, which bushing is limited in the position shown by way of the spring retainer ring 4 attached to the periphery of the tubular extension 2. The ball member 6 is disposed in the transverse passage 5 of the tubular extension 2. The spring 3 rests at its lower end against the ring 7 which is threaded on the tubular extension 2, which ring serves as a guide means and stop projection for the bushing 1.

The tubular extension 2 is sealed at the entrance to the brake cylinder housing 8 and is connected directly to the piston 10 which is loaded in the brake-applying direction by means of spring 9.

The brake cylinder housing 8, and the piston 10 including the sealing ring 11 form a pressure chamber 12 having a supply inlet 13 for connection to a pressure source. A piston rod 14 having a concave peripheral groove 15 on one portion thereof, a transverse projection 16 on another portion thereof, and a connector 17 on the end portion thereof, is disposed in the tubular extension 2 for axial movement to operate a brake lever, not shown, to which the piston rod is connected by connector 17. Spring 9 is compressed between the piston 10 and the cylinder cover 18 having an inwardly extending tubular projection 19 serving as a guide and stop for the piston rod 14, and having an exhaust opening 20.

Referring now to FIG. 2 of the drawing, there is shown another arrangement of the releasable locking means of the present invention on a cylinder for spring-applied brake in which a bushing 1a arranged in an axially movable manner on the tubular extension 2a against the bias of spring 3a as limited in movement by spring ring 4a. In the passage 5a, transversely disposed in a tubular extension 2a, there is disposed a ball 6a. The spring 3a is compressed between the bushing 1a and the threaded ring 7a secured on the tubular extension 2a to serve as the guide means and a projection stop for the bushing 1a. The tubular extension 2a is connetced to the piston 10a, the later being loaded by spring 9a in the brake-applying direction. The brake cylinder housing 8a and the piston 10a form with the piston seal 11a a pressure chamber 12a communicated with pressure supply opening 13a. The piston rod 14a, having transverse projection 16a thereon, is telescopically disposed in the tubular extension 2a, and is provided on the periphery thereof with a concave groove 15a, and is provided on the end thereof with a connector 17a, which connector may be connected to a brake lever, not shown, for controlling operation of the brake mechanism, not shown.

The spring 9a is compressed between the piston 10a and cylinder cover 18a having an inwardly extending tubular projection 19a serving as a guide means for the tubular extension, which cover includes an exhaust opening 20a.

Referring now to FIG. 3 of the drawing, there is shown the emergency brake release mechanism as combined with yet another type of cylinder for spring-applied brake.

The bushing 1b is disposed in an axially movable manner on the tubular extension 2b against the bias of spring 3b as limited in movement by spring ring 4b. In the passage 5b of the tubular extension 2b there is disposed a ball member 6b. The spring 3b is compressed between the bushing 1b and the ring 7b that is threaded on the tubular extension 2b to serve as a guide means and a stop projection for the bushing 1b. The tubular extension 2b is sealed at its entrance into the brake cylinder housing 8b and is directly connected to the piston 10b which is loaded in the brake-applying direction by means of spring 9b.

The brake cylinder housing 8b and piston 10b form with the piston sealing member 11b and the tubular extenson 2b a pressure chamber 12b, which includes a passage 13b for connection to a pressure supply, not shown. The piston rod 14b, having a concave peripheral groove 15b thereon, is displaceably arranged in a telescopic manner in the tubular extension 2b, the length of the groove along the axis of the piston rod being greater than distance h. The piston rod 14b supports on its inner end a plate having a tubular projection 16b thereon and supports on the outer end thereof a connector 17b by means of which connection is made with a brake lever, not shown. The spring 9b is compressed between the piston 10b and a separating wall 18b having a tubular projection 19b thereon. The spring chamber is communicated with atmosphere by means of passage 20b in the cylinder housing 8b.

In this embodiment, the brake cylinder additionally includes a service brake mehcanism consisting of a diaphragm 22b clamped at its periphery between the brake cylinder housing 8b and the cylinder cover 21b at an inner rim, which, with the cover 21b and with the supply inlet 23b, forms a diaphragm chamber 24b. The diaphragm 22b abuts against plate 25b which is connected to the piston rod 14b, by means of return spring 27b disposed in spring housing 26b. The plate 25b is biased relative to the separating wall 18b by spring 8b. The seals at the entrance of the tubular extension 2b into the brake cylinder housing 8b and the passage 5b are protected against contamination by means of a bellows 29b secured at one end to the housing and at the other end to the bushing 1b.

Referring now to FIG. 4 of the drawing, there is shown the emergency brake relaese mechanism associated with yet another type of cylinder for spring-applying the brake, demonstrating the advantage of the present emergency reelase mechanism where there is only a small space available between the brake cylinder and the brake-applying mechanism.

The bushing 1c is disposed in an axially movable manner on the tubular extension 2c against the spring 3c as limited in axial movement by means of spring ring 4c. The ball member 6c is disposed in the transverse passage 5c of the tubular extension 2c. The spring 3c abuts the threaded ring 7c, which is screwed onto the tubular extension 2c serving as a guide and stop member for bushing 1c. The tubular extension 2c is sealed at the entrance thereof into the brake cylinder housing 8c and is connected to a piston 10c in a power coupled manner by means of return spring 27c, the piston being loaded by means of spring 9c for movement in an axial direction on the tubular extension 2c· The brake cylinder housing 8c, the piston 10c and its sealing member 11c, and sealing member 19c form with tubular extension 2c a pressure chamber 12c having a supply inlet 13c for connection to a source of pressure, not shown. The piston rod 14c includes thereon a concave peripheral groove 15c and a connector 17c on the exterior end thereof for connection to a brake lever, not shown, and is arranged in an axially movable manner relative to the tubular extension 2c. The ring 16c is disposed on the tubular extension 2c as an abutment for one end of the return spring 27c having its other end abutted against the separating wall 18c, against which wall the main spring 9c is also abutted. The spring 9c chamber is communicated with atmosphere by way of a passage 20c in the cylinder housing 8c.

In this embodiment the service brake mechanism comprises a diaphragm 22c clamped at its outer rim between the cover 21c and the brake cylinder housing 8c. The cylinder cover 21c includes a supply inlet 23c for connection to a pressure source to pressurize diaphragm chamber 24c. A plate 25c is mounted on the tubular extension 2c and includes a circular projection 26c which is biased relative to the separating wall 18c by means of pressure spring 28c and to abut the circular projection 29c which engages the ring 16c securely fastened to the tubular extension 2c. The tubular extension 2c is sealed at the projection thereof through the diaphragm 22c and at the projection therof through the cover 21c.

In now describing the operation of the present invention, reference is made to FIG. 1 of the drawing in which the right-hand side of FIG. 1 illustrates the condition of operation of the cylinder when subjected to fluid under pressure. Under this condition, the pressure in chamber 12 moves the piston 10 in an upward direction against the biasing action of spring 9. As shown in the right half of FIG. 1, the piston rod 14 is locked in a telescopic position realtive to extension 2 since the balls 6 are prevented from moving radially outwardly from the locked position shown by means of the bushing 1. The balls 6 in the locked position are disposed in the passage 5 and in the circular groove 15 establishing a solid connection between the tubular extension 2 and the piston rod 14. Therefore, movement of the piston 10 and the tubular extension 2 in the upward brake release direction carries the piston rod 14 upwardly to release the brake. The projection 16 cooperates with the tubular projection 19 to restrict the maximum travel of the piston rod 14.

If it is now assumed that the fluid pressure fails or for other reasons pressure in chamber 12 is lost, spring 9 moves piston 10 in a downward or brake-applying direction carrying therewith the tubular extension 2 and the piston rod 14 locked thereto in the manner previously described, thus applying the brakes. The downward movement is limited by the brake operating structure, not shown.

If it is now desired to release the brake mechanism in the absence of fluid pressure in chamber 12, the bushing 1 is manually moved in a downward direction. This movement of the bushing 1 to the lower position now provides clearance between the bushing and the tubular extension 2 permitting radial movement of the ball 6 in the passage 5 to the outside position. The radial movement of the ball 6 to the outside is effected by the camming action of the concave groove 15, which camming action occurs by virtue of the piston rod connection to the brake control mechanism and by the correspondingly downward movement of the piston 10 under the urging of spring 9. After the above-described manual movement of the bushing 1 releasing the ball member 6, the piston 10 assumes the lower position illustrated in the left half of FIG. 1 of the drawing in which the piston 10 is disposed against the lower end of the brake cylinder housing 8, while the piston rod 14 may move freely in the tubular extension 2 in an upward direction to effect release of the brakes.

Upon the return of the pressure medium, the pressure increases in pressure chamber 12 so that the piston 10, with the tubular extension 2, is moved in an upward direction. When the passage 5 in tubular extension 2 and the concave peripheral groove 15 are disposed in side-by-side registration, an inwardly angled camming surface on the bushing 1, as urged upwardly by the compression of spring 3, cams the ball 6 radially toward the inside of tubular extension 2 to re-engage in peripheral groove 15. The bushing 1 is displaced by spring 3 in an upward direction until bushing 1 abuts spring ring 4 as shown in the right half of FIG. 1. Thereby, the locking engagement between the tube 2 and the piston rod 14 is re-established and the brake cylinder is again in condition for normal operation.

In now describing the operation of the embodiment of FIG. 2 of the drawing, it will be readily observed that the operation thereof corresponds to the above-described operation of the device disclosed in FIG. 1. In the right half of the FIG. 2 there is shown the condition of the cylinder and the locking mechanism under pressurized condition of the cylinder device, while in the left-hand side of the drawing there is shown the unlocked condition of the locking mechanism, with the piston rod disengaged from the tubular extension. By this arrangement the upward movement of the piston rod 14a is limited by the cessation of movement of the brake mechanism connected to connection 17a before the projection 16a of the tubular extension 2a abuts the stop 19a. It is also readily seen that relocking of the piston rod to the tubular extension occurs automatically when the pressure medium once again is restored.

In now describing the operation of the device disclosed in FIG. 3 of the drawing, it is to be noted that the right half of FIG. 3 illustrates the locked condition of the piston rod relative to the tubular extension during pressurization of the cylinder, while the left half of FIG. 3 illustrates the unlocked condition of the piston rod relative to the tubular extension. When the pressure chamber 12b is pressurized via supply inlet 13a, piston 10b assumes the position as shown on the right half of the drawing. The tubular extension 2b is moved in an upward direction. The ball member 6b is located in the concave peripheral groove 15b on the piston rod and also is partially positioned in the passage 5b. The bushing 1b prevents radial movement of the ball 6b toward the outside. Since the length of the circular groove 15b axially of the piston rod 14 is greater than $h$, it is apparent that during the action of the service brake in pressurizing the diaphragm chamber 24b the piston rod 14b will execute the maximum travel $h$ of the service brake.

Upon the failure of the pressure supply, depressurizing pressure chamber 12b, the piston 10b and its tubular extension 2b move in a downward direction through the path $h+x$.

The ball member 6b that is located in the passage 5b abuts against the lower rim of the peripheral groove 15b and causes the piston rod 14b to move in a downward direction to apply the brakes.

To effect emergency release of the brake under the no pressure condition, the bushing 1b, as illustrated in the left half of FIG. 3, is manually pushed downwardly a distance such that the ball member 6b, in response to the angle of curvature of the groove 15, and in response to spring 27b and 28b acting upwardly against the piston rod 14b, are forced in an outward direction, releasing rod 14b relative to extension 2b, thus releasing the brakes.

Under this condition the service brake is once again ready for service, provided the failure of the pressure medium affects only the pressure chamber 12b. This is so since the piston rod 14b may travel through the distance $h$ without effecting relocking engagement between the tubular extension 2b and the piston rod 14b, as illustrated on the left side of FIG. 3.

In now describing the operation of the brake cylinder and the emergency release apparatus as disclosed in FIG. 4 of the drawing, it will again be seen that the lock condition of the piston rod 14c relative to the tubular extension 2c is illustrated in the right half of FIG. 4. In this embodiment, upon pressurization of the service brake chamber 24c, the service brake mechanism comprised of diaphragm 22c, plate 25c carrying projection 29c engaged with the ring 16c and spring 22c, as well as pressure spring 28c can effect a downward movement of tubular member 2c and piston rod 14c a distance $h$ as limited by projection 26c on plate 25c. Also, the brake applying spring 9c, upon loss of pressure in the pressure chamber 12c, will move the piston 10c, tubular extension 2c and piston rod 14c in the downward direction a distance $h+x$, with $x$ representing the over travel.

If now, upon failure of pressure in chamber 12c effecting an application of the brakes by brake-applying spring 9c, it is desired to release the brakes, the bushing 1c is moved in an upward direction. Therefore, the ball member 6c can move in a radially outward direction to the outside position in passage 5c, thereby releasing the piston rod 14c which is displaced in an upward direction as illustrated in the left half of FIG. 4, thus releasing the brakes.

In contrast to the operation of the device disclosed in FIG. 3, the device disclosed in FIG. 4 does not provide for further use of the service brake mechanism after the piston rod 14c has been released relative to the tubular extension 2c. In FIG. 4, recharging of the pressure in pressure chamber 12c is required before the piston 10c will move in an upward direction. When this occurs, the tubular extension 2c will, under the urging of return spring 27c, likewise move in an upward direction. The piston rod 14c is prevented from a further movement in an upward direction by means of the connector 17, which is connected to the brake lever, not shown. When the passage 5c and the peripheral groove 15c are in lateral registration, the ball members 6c are forced radially inward to re-engage peripheral groove 15c by means of the bushing 1c movable under the urging of spring 3c. Thus, the piston rod 14c is again locked relative to tubular extension 2c in the manner illustrated in the right half of FIG. 4, thereby re-establishing the brake cylinder for operation under conditions.

From the foregoing, it is readily understood that the emergency brake release mechanism as hereinbefore described is also suitable for use with brake mechanisms utilizing either air or liquid as the pressurization means.

Having now described the invention, what I claim as new and desire to secure by Letters Patent, is:

1. A cylinder for spring-applied brake with emergency brake release, comprising:
   (a) a cylinder having piston means reciprocably movable therein;
   (b) spring means in said cylinder biasing said piston in a brake applying direction;

(c) fluid pressure chamber means in said cylinder operable when pressurized to move said piston in a brake release direction in overriding opposition to said spring means;

(d) a first member movable with said piston and extending axially through the end of said cylinder;

(e) a second member carried by said first member for axial movement relative to said first member and adapted for connection at its free end to braking means; and (f) manually releasable emergency brake release means positively holding said first and second members in a single predetermined axial relationship, said manually releasable emergency brake release means operative to limit movement of said first and second members out of said single predetermined axial relationship, and automatically restored to operative positive holding condition, following displacement of said member out of said single predetermined axial relationship, only upon restoration of said members to said single predetermined axial relationship.

2. A cylinder for spring-applied brake with emergency brake release, as recited in claim 1, in which, said emergency brake release means further comprises:

(a) a depression on the surface of one of said first and said second members;

(b) a third member movable along a transverse path relative to the other of said first and said second members for seating in said depression when said depression is disposed on said path;

(c) a fourth member slidably disposed on said other of said first and said second members;

(d) means biasing said fourth member in a first direction for moving said third member along said path to engage said one member and when said depression is disposed on said path to urge said third member to a locked position in which said third member is seated in said depression while partially disposed on said second member to limit axial movement between said first member and said second member;

(e) said fourth member operable upon manual movement thereof in a direction opposite said first direction in overriding opposition to said bias to unlock said third member; and (f) said depression and said third member being correlatively formed to move said third member along said path to disengage said third member relative to said depression upon the application of force tending to axially correlatively move said first and said second members while said fourth member is manually disposed to unlock said third member.

3. A cylinder for spring-applied brake with emergency brake release, as recited in claim 2, in which:

(a) said one of said first and said second members comprises a rod;

(b) said rod is telescopically disposed within the other of said first and said second members; and (c) said other of said first and said second members comprises a tubular member.

4. A cylinder for spring-applied brake with emergency brake release, as recited in claim 2, in which:

(a) said depression is concave;

(b) said third member comprises a ball; and (c) said path is defined by an aperture extending transversely through said other of said first and said second members.

5. A cylinder for spring-applied brake with emergency brake realse, as recited in claim 4, in which said concave depression comprises a peripheral groove.

6. A cylinder for spring-applied brake with emergency brake release, as recited in claim 2, in which:

(a) said fourth member is disposed on said other member for movement transversely across said path;

(b) said fourth member including:

(i) a cam member engageable with said third member in said first direction to cam said fourth member a first increment along said path into engagement with said one of said first and said second members when said depression is displaced relative to said path and a second increment to seat in said depression when said depression is disposed on said path; and (ii) a lock surface coextensive with one end of said cam and extending transversely of said path to override said path under the urging of the bias when said third member is seated in said depression to lock said third member in said depression until manual movement of said fourth member in the reverse direction in opposition to said bias disengages said lock surface and said cam from said third member.

7. A cylinder for spring-applied brake with emergency brake release, as recited in claim 6, in which:

(a) said path is defined by an aperture transversely extending through said other of said first and said second members;

(b) said third member comprises a ball disposed in said aperture; and (c) said depression is outwardly tapered and of such configuration as to receive therein a portion of the ball less than a hemisphere.

8. A cylinder for spring-applied brake with emergency brake release, as recited in claim 7, in which said depression comprises a peripheral groove.

9. A cylinder for spring-applied brake with emergency brake release, as recited in claim 6, in which:

(a) said other of said first and said second members includes a limit engageable by said fourth member when said fourth member lock surface and said cam surface are disengaged relative to said third member;

(b) said fourth member includes a stop surface coextensive with the other end of said cam surface for extending transversely of said path to retain said third member on said other of said first and said second members when said fourth member is engaged with said limit.

10. A cylinder for spring-applied brake with emergency brake release, as recited in claim 1, in which:

(a) second piston means disposed in said cylinder is biased in the brake release direction and movable under the application of service fluid pressure a predetermined distance in the brake-applying direction;

(b) the opposite end of said second member is attached to said second piston means; and (c) said manually releasable means operable when limiting axial movement between said first member and said second member to provide for free axial travel of said second member relative to said first member through a distance equal to said predetermined distance.

11. A cylinder for spring-applied brake with emergency brake release, as recited in claim 1, in which:

(a) second piston means disposed in said cylinder are biased in the brake release direction and movable in the brake-applying direction under fluid pressure in the brake-applying direction;

(b) said first member disposed for axial slidable movement relative to said piston means and said second piston means;

(c) said first member having stop means thereon engageable by said piston means and said second piston means in the brake-applying direction such that the independent movement of each of said piston means and said second piston means relative to the other in the brake-applying direction carries said second member therewith.

12. A cylinder for spring-applied brake with emergency brake release, as recited in claim 10, in which said manually releasable means includes means operable when limiting axial movement between said first and said second members to prevent said relative axial movement when said fluid pressure chamber means is depressurized and said service fluid pressure is absent.

13. A cylinder for spring-applied brake with emergency brake release, as recited in claim 2, further including,
(a) a second piston means disposed in said cylinder, and attached to the opposite end of said second members,
(b) means biasing said second piston in the brake release direction,
(c) fluid pressure chamber means in said cylinder operable when pressurized to move said second piston from a brake release position through a predetermined distance in the brake-applying direction,
(d) said depression having a width along the axis of said second member such as to provide for axial movement of said second member in the brake-applying direction relative to said first member equal to said predetermined distance when said third member is engaged in said depression; and
(e) said second piston adapted for movement from the brake release position through a distance greater than said predetermined distance.

References Cited

UNITED STATES PATENTS

| | | | |
|---|---|---|---|
| 512,790 | 1/1894 | Bachman | 92—29 X |
| 1,020,685 | 3/1912 | Cubelic | 92—29 X |
| 1,046,145 | 12/1912 | Budesheim | 188—67 X |
| 1,914,624 | 6/1933 | Thompson | 303—89 X |
| 2,851,126 | 9/1958 | Ward | 188—67 X |
| 2,905,274 | 9/1959 | Cook | 188—67 X |
| 2,955,854 | 10/1960 | Musser | 188—67 X |
| 3,065,997 | 11/1962 | Frankhouser et al. | 92—64 X |
| 3,272,566 | 9/1966 | Clack | 188—170 X |

FOREIGN PATENTS

| | | |
|---|---|---|
| 166,138 | 3/1922 | Great Britain. |
| 286,304 | 6/1931 | Italy. |

MARTIN P. SCHWADRON, Primary Examiner

I. C. COHEN, Assistant Examiner

U.S. Cl. X.R.

92—63; 188—67